United States Patent [19]

Ewing

[11] Patent Number: 4,995,188
[45] Date of Patent: Feb. 26, 1991

[54] FISHING ROD AND METHOD FOR WEIGHING A FISH AND A SCALE FOR WEIGHING AN OBJECT

[76] Inventor: Brent L. Ewing, 1043 Coolidge, Wichita, Kans. 67203

[21] Appl. No.: 404,554

[22] Filed: Sep. 8, 1989

[51] Int. Cl.⁵ ............................................. A01K 87/00
[52] U.S. Cl. ......................................... 43/23; 43/18.1; 43/25
[58] Field of Search ............................. 43/18.1, 23, 25

[56] References Cited

U.S. PATENT DOCUMENTS

| | | | |
|---|---|---|---|
| 461,106 | 10/1891 | Oberly | 43/18.1 |
| 1,113,847 | 10/1914 | Turner | 43/25 |
| 1,174,526 | 3/1916 | Stoddart | 43/18.1 |
| 1,255,269 | 2/1918 | Zinkiewiez | 43/18.1 |
| 2,003,893 | 6/1935 | La Pan | 43/25 |
| 2,678,817 | 5/1954 | Mitton | 43/23 |
| 2,750,184 | 6/1956 | Warndahl | 43/23 |
| 2,765,535 | 10/1956 | Weber | 43/25 |
| 2,816,750 | 12/1957 | Martin | 43/18.1 |

Primary Examiner—Kurt Rowan
Attorney, Agent, or Firm—John Wade Carpenter

[57] ABSTRACT

A fishing rod having a structurally tapering rod section and a handle connected to the tapering rod section. The handle has a longitudinal bore, and a rod having an external surface with weight calibrations is slidably disposed in the longitudinal bore. A calibrated compression spring helically surrounds the external surface of the rod within the longitudinal bore. The compression spring biases the rod towards the structurally tapering rod while in the longitudinal bore. A hook support member connects to an end of the rod, and a hook member pivotally connects to the hook support member. A method for measuring the length of a fish and for weighing the fish. A scale for weighing an object.

33 Claims, 7 Drawing Sheets

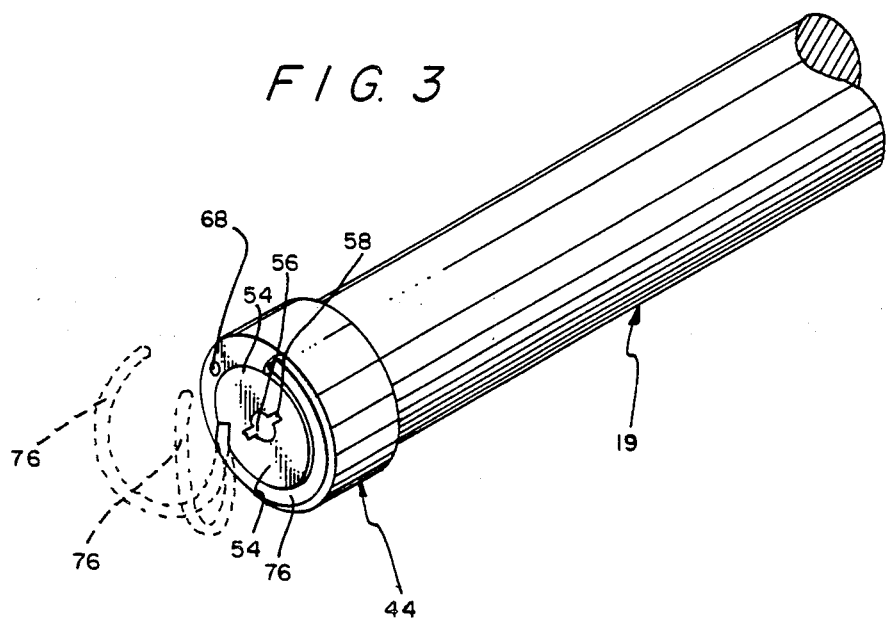
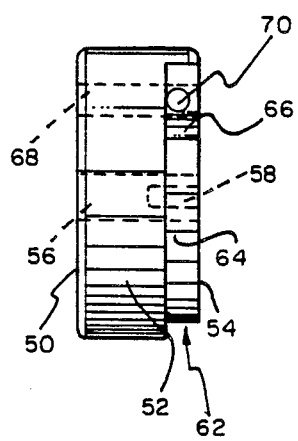
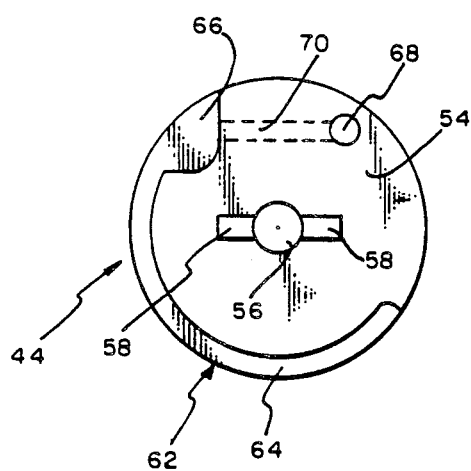

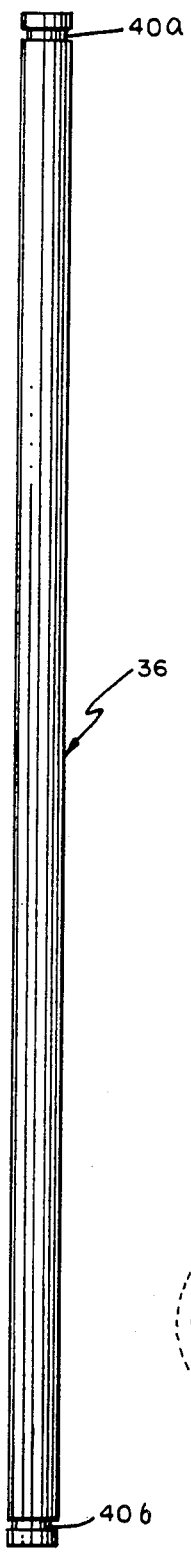
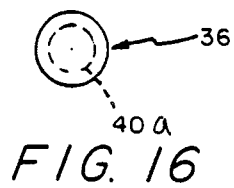
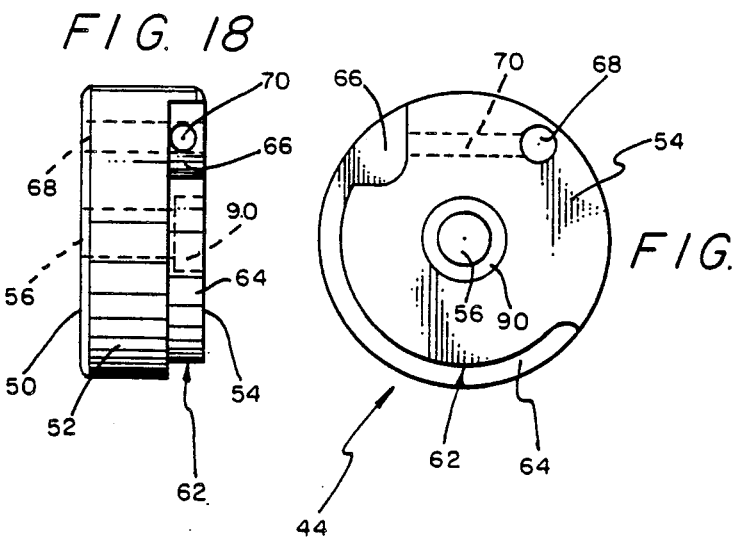
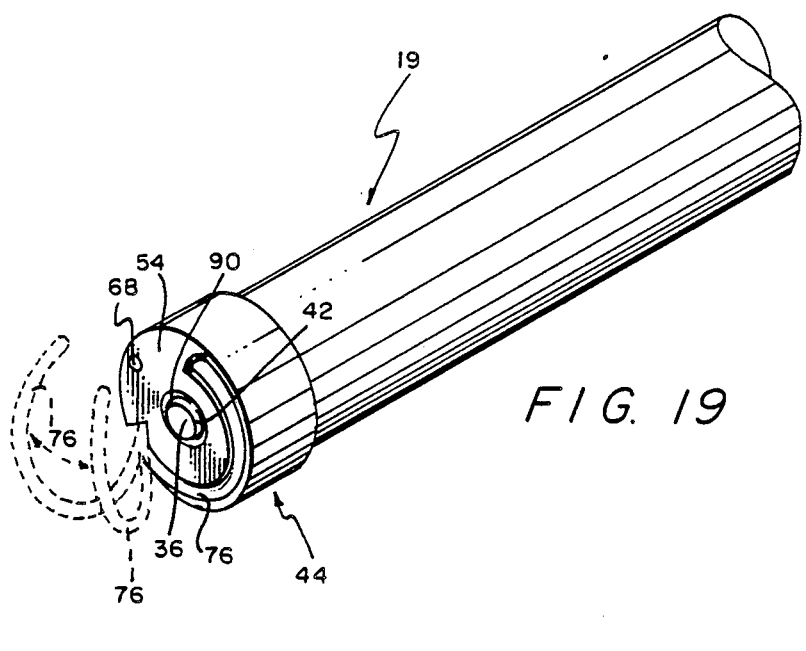

4,995,188

FISHING ROD AND METHOD FOR WEIGHING A FISH AND A SCALE FOR WEIGHING AN OBJECT

BACKGROUND OF THE INVENTION

1. Field of the Invention

The present invention provides a fishing rod. More particularly, the present invention is related to a fishing rod and to a method for measuring the length of a fish and for weighing a fish. The present invention also provides a scale for weighing an object.

2. Description of the Prior Art

A patentability investigation was conducted and the following U.S. patens were discovered: No. 2,237,370 to Shelster; No. 2,750,184 to Warndahl; No. 2,994,622 to Miller; No. 3,276,527 to Nelson; No. 4,721,174 to Letzo; and No. 4,785,897 to Keinert. None of the foregoing prior art U.S. patents teach or suggest the particular scale, and the particular fishing rod and method of this invention.

SUMMARY OF THE INVENTION

The present invention accomplishes its desired objects by broadly providing a fishing rod comprising a structurally tapering rod section and a handle connected to the structurally tapering rod section. The handle has a structure defining a generally longitudinal bore having a closed end and an open end. Alternatively, the handle surrounds a lower part of the tapering rod section and the lower part of the tapering rod section has a generally longitudinal bore having a closed end and an open end. A rod with an external surface is slidably disposed in the generally longitudinal bore. The rod has weight calibrations spaced longitudinally along the external surface thereof. A calibrated spring helically surrounds the external surface of the rod within the generally longitudinal bore and biasingly urges the rod within the generally longitudinal bore. More particularly, the spring biases the rod away from the open end of the bore and towards the closed end of the bore and towards the tapering rod section. A hook support member connects to an end of the rod; and a hook member is pivotally connected to the hook support member. Preferably, the structurally tapering rod section includes length indicia, and the calibrated spring is a compression spring.

The present invention further accomplishes its desired objects by providing a method for measuring the length of a fish and weighing the fish comprising the steps of:

(a) providing a fishing rod having a structurally tapering rod section with length indicia and a handle connected to the structurally tapering rod section, said tapering rod section or said handle including a structure defining a generally longitudinal bore having a rod with an external surface bearing weight calibrations and slidably disposed in said longitudinal bore with a compression spring helically surrounding the rod;

(b) connecting a hook support member to an end of said rod of step (a) wherein said hook support member has a hook recess and a hook member pivotally connected to said hook support member such as to be pivotally lodged in said hook recess;

(c) providing a fish;

(d) elevating the fish to be in a position contiguous to the length indicia on the structurally tapering rod section;

(e) determining the length of the fish from the length indicia;

(f) pivoting a structural portion of the hook member out of the hook recess;

(g) engaging the fish to the structural portion of the hook member out of the hook recess such that the weight of the fish causes the rod to compress the compression spring and expose the external surface of the rod bearing the weight calibrations; and (h) determining the weight of the fish from the weight calibrations on the exposed external surface of the rod.

Preferably the method additionally comprises disengaging the fish from the structural portion of the hook member, and pivoting the structural portion of the hook member into the hook recess of the hook support member.

The present invention still further accomplishes its desired objects by broadly providing a scale for weighing an object comprising a housing having a structure defining a generally longitudinal bore. A rod with an external surface is slidably disposed in the generally longitudinal bore. The rod has weight calibrations spaced longitudinally along the external surface thereof. A calibrated spring helically surrounds the external surface of the rod within the generally longitudinal bore and biasingly urges the rod within the generally longitudinal bore. A hook support member connects to an end of the rod; and a hook member is pivotally connected to the hook support member.

It is therefore an object of the present invention to provide a fishing rod having a handle that includes a scale for weighing a fish.

It is another object of the present invention to provide a method for measuring the length of a fish and weighing the fish.

It is yet another object of the present invention to provide a scale for weighing objects.

These, together with the various ancillary objects and features which will become apparent to those skilled in the art as the following description proceeds, are attained by this novel fishing rod, method and scale, a preferred embodiment being shown with reference to the accompanying drawings, by way of example only, wherein:

BRIEF DESCRIPTION OF THE DRAWINGS

FIG. 3 is a partial perspective view of the end of the handle of the fishing rod depicting the pivotally mounted hook member;

FIG. 4 is a top plan view of the hook support member that pivotally supports the hook;

FIG. 5 is a side elevational view of the hook support member;

FIG. 7 is a side elevational view of the rod member which supports a weight indicia, calibrations or the like;

FIG. 15 is another embodiment of the rod member which supports a weight indicia, calibrations, or the like;

FIG. 16 is an end elevational view of the rod member of FIG. 15;

FIG. 17 is a top plan view of another embodiment of the hook support member which pivotally supports the hook;

FIG. 18 is a side elevational view of the hook support member in FIG. 17;

FIG. 19 is a partial perspective view for another embodiment of the end of the handle of a rod illustrating the hook pivotally mounted to the embodiment of the hook support member of FIGS. 17 and 18.

DETAILED DESCRIPTION OF THE INVENTION

Figure 1:
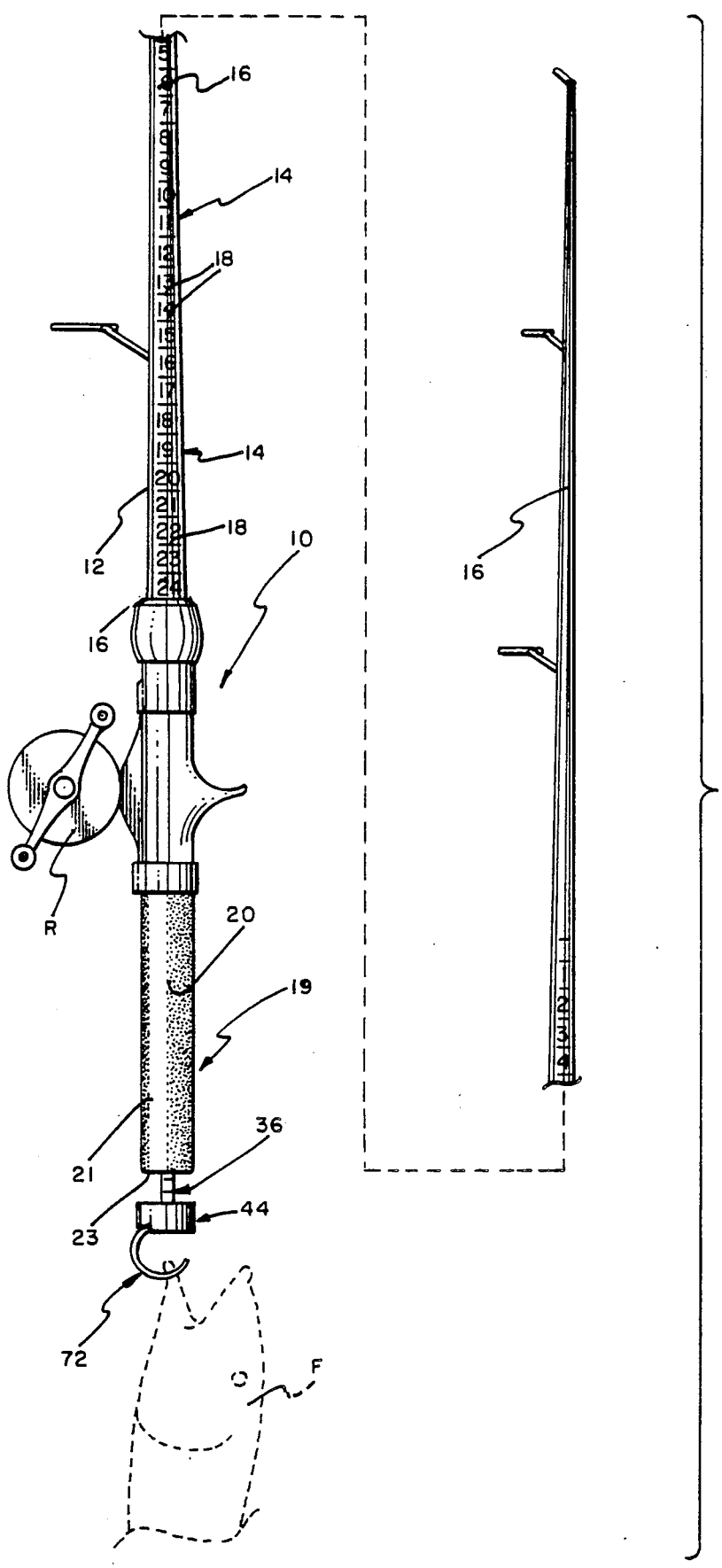
FIG. 1 is a segmented side elevational view of the fishing rod-weight scale combination.

Referring in detail now to the drawings wherein similar parts of the invention are identified by like reference numerals, there is seen a fishing rod, generally illustrated as 10 in FIG. 1, having a reel R attached thereto in a well-known arrangement. The fishing rod 10 has a structurally tapering rod section 16 which tapers forward from a larger diameter rod section into a smaller diameter rod section, which is typical of any conventional fishing rod 10. The fishing rod 10 includes mounted thereto or therearound a sleeve or tape (or the like) 12 having length indicia 14 thereon and fabricated of a formed pliable material (such as a decal) contoured to wrap around the structural tapering rod section 16 (preferably the intermediate part of the tapering rod section 16) of the fishing rod 10. Alternatively, the length indicia 14 may be labeled or engraved directly onto or into the structural tapering rod section 16 of the fishing rod 10. The tape 12, which may be a standard measuring tape, has length indications or calibrations 18, denoting inches and subsections of inches, longitudinally spaced along and/or on an external surface of the structural tapering rod section 16 of the fishing rod 10 or on the sleeve or tape 12, which circumscribes the structural tapering rod section 16. The length indicia 14, more specifically the length calibrations 18, will be visible to the naked eye for measuring the length of a fish F or the like.

Figure 2:
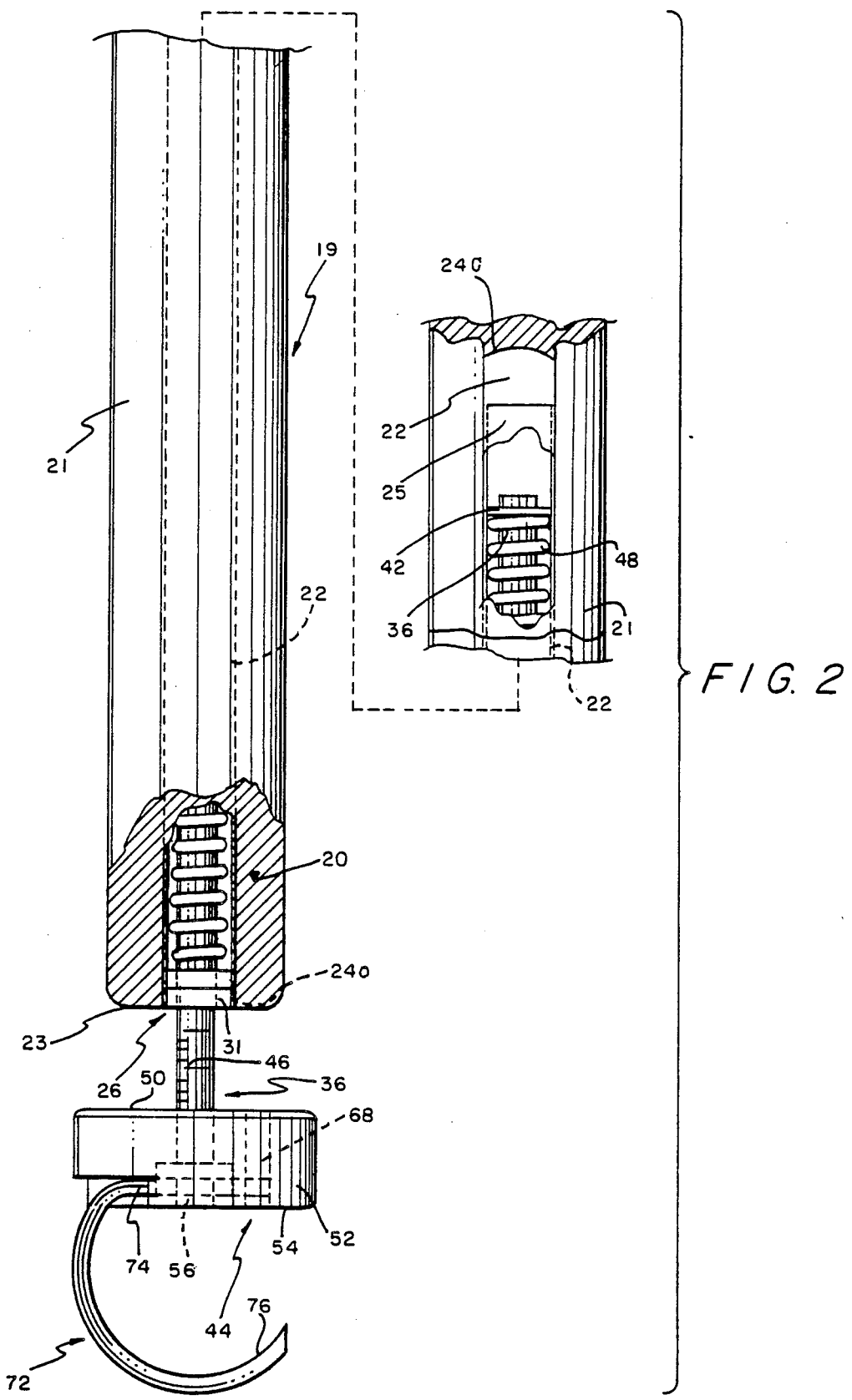
FIG. 2 is a partial, segmented side elevational view of the handle of the fishing rod having the scale slidably operating therein.
Figure 6:
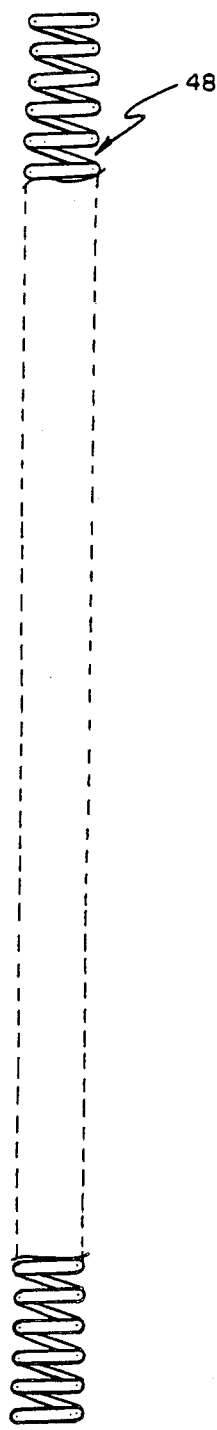
FIG. 6 is a side elevational view of the compressor spring.
Figure 20:
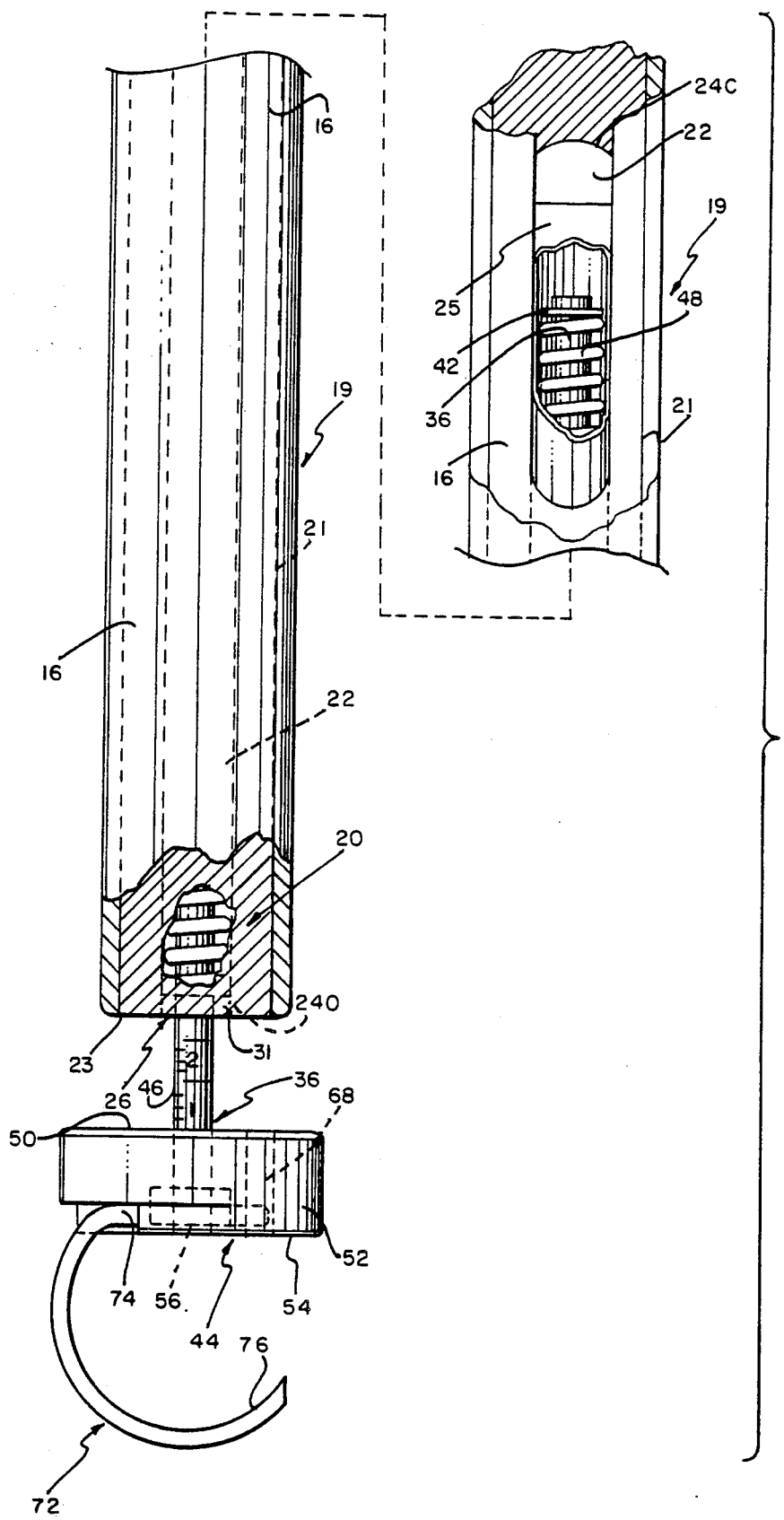
FIG. 20 is a partial, segmented side elevational view of the lower part of the tapering rod section having a longitudinal bore where the scale slidably operates and the handle surrounds the lower part of the tapering rod section.

The fishing rod 10 has a handle, generally illustrated as 19, which connects to the structural tapering rod section 16 and which includes or comprises a structure defining a housing 20 with an external wall 21, a lower housing surface 23, and an elongated cavity or longitudinal bore 22 generally formed coaxially with the housing 20. The bore 22 has a closed end 24c and a bore opening 24o which allows the bore 22 to communicate with the atmosphere. As best illustrated in FIG. 2, the structural surface of the housing 20 between the bore opening 24o and the external wall 21 is the lower housing surface 23. A conduit or sleeve 25 is slidably lodged in the bore 22 such as to essentially traverse a substantial part of the longitudinal length thereof. In another embodiment (see FIG. 20), the lower part of the tapering rod section 16 supports the handle 19 which circumscribes or surrounds the lower part of the tapering rod section 16 to encapsulate the same. In this embodiment, the lower part of the tapering rod section 16 has the longitudinal bore 22, and not the handle 16 itself. The structure of the lower part of the tapering rod section 16 defines the housing 20 with the external wall 21, the lower housing surface 23, and the longitudinal bore 22.

Figure 13:
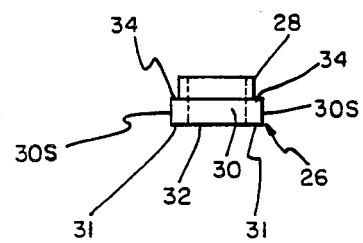
FIG. 13 is a side elevational view of the guide member.
Figure 14:
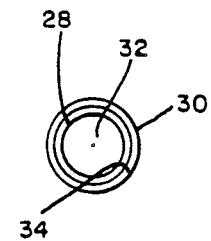
FIG. 14 is a top plan view of the guide member.

A guide member, generally illustrated as 26 in FIG. 13, is disposed snugly in the bore opening 24o. The guide member 26 includes a head section 28 and a base section 30 integrally formed with the head section 28. The base section 30 has an outer extremity surface 30s. A guide aperture 32 extends through the head section 28 and the base section 30. As best shown in FIGS. 13 and 14, the base section 30 of the guide member 26 flanges and protrudes beyond the head section 28 such that the flanging, protruding part of the base section 30 defines on the top thereof a shoulder 34, and on the bottom thereof a base surface 31 between the guide aperture 32 and the outer extremity surface 30s of the base section 30. The outer extremity surface 30s of the base section 30 snugly engages the walls of the bore 22. When the guide member 26 is disposed in the bore opening 24o after the conduit or sleeve 25 has been slidably passed into the bore 22, the shoulder 34 or the guide member 26 supports an end of the conduit or sleeve 25. In another embodiment, the outer extremity surface 30s may support a sealant (e.g. tape, caulking material, etc.) which seals the area or distance between the outer surface 30s and the wall of the bore 22 or the sleeve 25.

Figure 11:
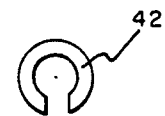
FIG. 11 is a top plan view of the collar.

A rod, generally illustrated as 36, slidably and reciprocatively passes through the guide aperture 32 of the guide member 26 and into the bore 22 such as to be generally concentric with the sleeve 25 that has been slidably positioned within the bore 22. The rod 36 has two preferred embodiments, the preferred embodiment in FIGS. 7 and 8 and the preferred embodiment in FIGS. 15 and 16. In the preferred embodiment in FIGS. 7 and 8, the rod 36 is formed at one end with an aperture 38 extending therethrough and at the other end with a notch 40a. In the preferred embodiment in FIGS. 15 and 16, the rod 36 is formed at one end with notch 40a and at the other end with notch 40b. In both embodiments of the rod 36, the end of the rod 36 with the notch 40 is slidably and reciprocatively housed within the bore 22, more specifically within the sleeve 25. A collar 42 (see FIG. 11) is removably mounted within the notch 40a of the rod 36 for slidably resting along the walls of the sleeve 25 within the bore 22. The collar 42 reciprocatively moves with the rod 36 when the rod 36 is reciprocatively moved within the sleeve 25 (and bore 22) and within the aperture 32 of the guide member 26. For both preferred embodiments of the rod 36, a hook support member, generally illustrated as 44, is secured to the end of the rod 36 opposed to the end with notch 40a, in accordance with a procedure more particularly described below. Spaced longitudinally along the external surface of the rod 36 are weight calibrations 46 which denote pounds and/or ounces. The weight calibrations 46 will be visible to the naked eye as the rod 36 becomes slidably extended away from the housing 20, more specifically away from the lower housing surface 23 and the base section 30 of the guide member 26.

A calibrated compression spring 48 is coiled helically and longitudinally along and around the external surface of the rod 36 such that one end of the compression spring 48 is supported by the head section 28 while the other end urgingly abuts against or otherwise contacts the collar 42 in notch 40a of the rod 36 for biasing the rod 36 towards the closed end 24c of the bore 24 and towards the rod section 16. As best shown in FIG. 2, the coiled, calibrated compression spring 48 is more specifically compressed between the collar 42 in notch 40a of the rod 36 and the shoulder 34 of the base section 30 such as to yieldably, biasingly maintain the support member 44 in an abutting relationship against the lower housing surface 23 when the rod 36 is not being slid or extended away from the lower housing surface 23 and the base section 30 of the guide member 26 by a force (such as the weight of a fish F), as will be described in greater detail hereinafter.

Figure 7:
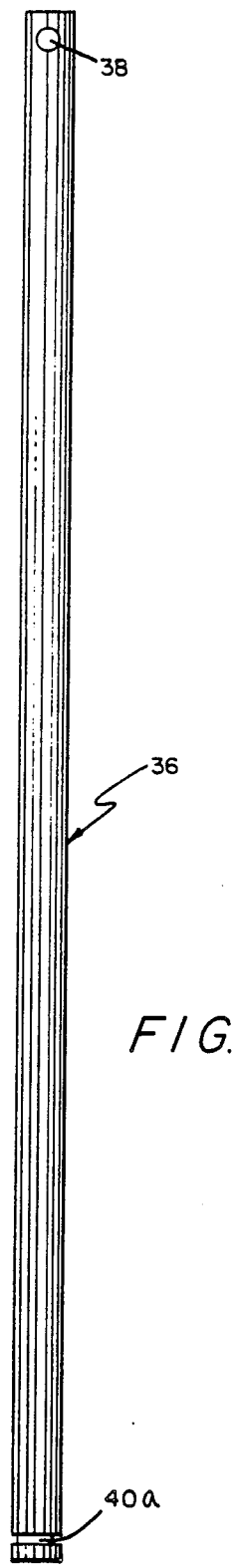
Figure 8:
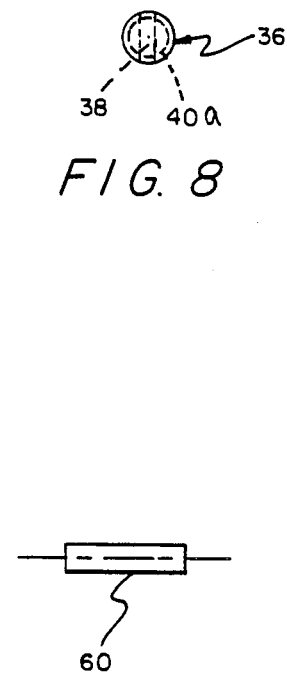
FIG. 8 is an end elevational view of the rod member.
Figure 9:
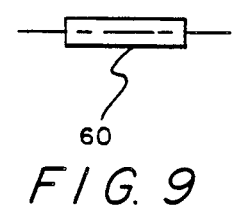
FIG. 9 is a pin which slidably engages an end of the rod member for connecting the hook support member to the rod member.
Figure 10:
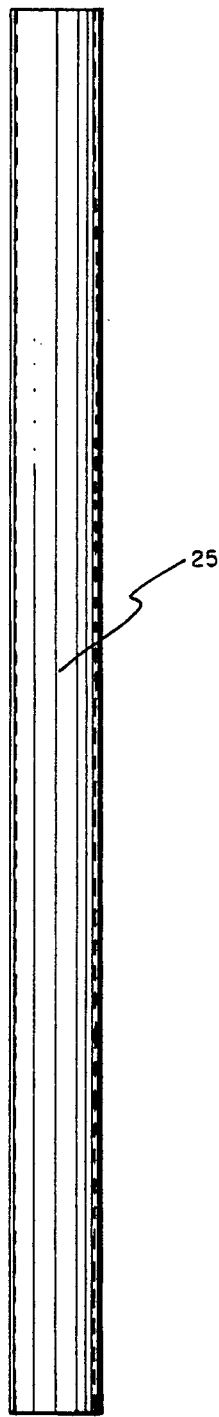
FIG. 10 is a side elevational view of the sleeve.

The support member 44 has two preferred embodiments, namely the preferred embodiment of FIGS. 4 and 5 and the preferred embodiment of FIGS. 17 and 18. In both preferred embodiments, the support member 44 is preferably circular and cylindrical in form, as clearly depicted in FIGS. 3 and 19. More specifically, for both embodiments of the support member 44, the support member 44 preferably includes a bottom 50 and a circular external wall 52 that terminates at one edge in the bottom 50 and terminates at another edge in a top 54. An opening 56 extends entirely through the support member 44 from top 54 to bottom 50 and is centrically disposed such as to be generally coaxial with the remaining structure of the support member 44 itself. For the embodiment of the support member 44 in FIGS. 4 and 5, a pair of diametrically opposed recesses 58—58 is formed in the top 54 such that an end of each of the recesses 58—58 terminates in the opening 56. The preferred embodiment of the rod 36 in FIGS. 7 and 8 is connected or coupled to the preferred embodiment of the support member 44 in FIGS. 4 and 5 by slidably passing the aperture 38-end of the rod 36 in FIG. 7 through opening 56 until the aperture 38 is exposed, inserting a pin 60 (see FIG. 9) through and into the aperture 38, and subsequently pulling the notch 40a-end of the rod 36 away from the support member 44 in FIGS. 4 and 5 until the pin 60 is lodged within the opposed recesses 58—58. For the preferred embodiment of the support member 44 in FIGS. 17 and 18, the opening 56 terminates in a recess 90 which is generally concentric and coaxial with opening 56. The preferred embodiment of the rod 36 in FIGS. 15 and 16 is connected or coupled to the preferred embodiment of the support member 44 in FIGS. 17 and 18 by initially slidably passing the notch 40b-end of the rod 36 in FIG. 15 through the opening 56 and beyond recess 90 until notch 40b is exposed, inserting a collar 42 into the notch 40b such that the collar 42 flanges slightly beyond the circumferential, external surface of the rod 36, and subsequently pulling the notch 40a-end of the rod 36 away from the support member 44 in FIGS. 17 and 18 until the collar 42 in notch 40b seats within the recess 90, as best shown in FIG. 19.

In both embodiments of the support member 44, a hook recess, generally illustrated as 62, is formed along a portion of the external wall 52 and the top 54. The hook recess 62 comprises or consists of an arcuate recess 64 and a triangular recess 66 communicating with the arcuate recess 64. In addition to opening 56, both embodiments of the support member 44 also include a vertical opening 68 which also extends entirely through the support member 44 from top 54 to bottom 50. A generally horizontal opening 70 extends in the structure of both embodiments of the support member 44 from the vertical opening 68 to the hook recess 62, more particularly to the triangular recess 66, such that the vertical opening 68 communicates with the hook recess 62.

Figure 12:
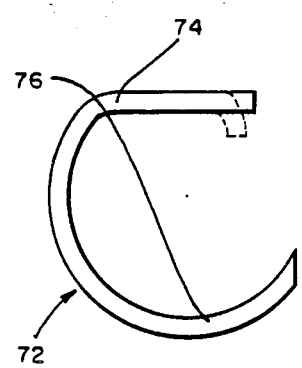
FIG. 12 is a top plan view of the hook member.

A hook member, generally illustrated as 72, is provided to pivotally connect to both embodiments of the support member 44. The hook member 72 structurally comprises a shank 74 and a bow section 76 integrally formed with the shank 74. The shank 74 is slidably, rotatably lodged within the horizontal opening 70 of any of the preferred embodiments of the support member 44 such that the hook member 72 (more particularly the bow section 76) can be pivotally positioned and stored within the hook recess 62 of any of the preferred embodiments of the support member 44 when not in use, and pivoted away from the hook recess 62 into the depending posture of FIG. 1 when it is desired to employ the hook member 72, such as to engage a fish F (or any other object) to be weighed. The hook recess 62 provides a safety feature in that when the bow section 76 of the hook member 72 is pivotally lodged in the arcuate recess 64 of the hook recess 62, a substantial structure of the hook member 72 is within the hook recess 62, is offset and below a horizontal plane along the surface of the top 54, and the protruding pointed end of the bow section 76 is not available for injuring the user. The vertical opening 68 enables the extreme end of the shank 74 to be bent or otherwise deformed (see dotted lines in FIG. 12) and reside within the vertical opening 68 after passing through the horizontal opening 70 such that the shank 74 can be steadfastly rotatably maintained within the horizontal opening 70 without slidably slipping away from the same.

With continuing reference to the drawings for operation of the invention, a fish F (or other object) is caught while fishing. The fishing rod 10 immediately furnishes the user with the dual capabilities of measuring the length of the fish F and the weighing of the fish F. The caught fish F is elevated to hang contiguously or in close proximity to the length calibrations 18 of the length indicia 14. The appropriate length calibrations 18 will register opposite the extreme opposed ends of the fish F such that length can be readily determined. Immediately thereafter the bow section 76 of the hook member 72 is pivoted downwardly to the depending position of FIGS. 1 or 2 for engaging the fish F to weigh the same. As previously indicated, pivotation of bow section 76 occurs when the shank 74 is caused to be rotated within the horizontal opening 70 of the support member 44. Shank 74 will not slip away from the horizontal opening 70 due to its bent or deformed end which resides or is housed by vertical opening 68. The compression spring 48 is calibrated to have a tension such that when the rod 36 is retracted through a downward pull on the hook member 72, more particularly on the bow section 76 of the hook member 72, by the weight of a fish F (or any weight from any other object), the appropriate weight calibrations 46 (i.e., scale or weight indicia) on the rod 36 will register opposite the base surface 31 of the base section 30 of the guide member 26, depending on the weight of the fish F or on the weight of any other object suspended from the bow section 76 of the hook member 72. The particular indicated graduation mark of the weight calibrations 46 collimated with the base surface 31 of the base section 30 of the guide member 26 will indicate the number of pounds, kilograms, grams or ounes exerted on the compressor spring 48 by the weight of the fish F or other object, or, in other words, the weight of the fish F or the other object. After the fish F or the other object has been weighed, the same is removed, and the hook member 72 can be pivoted towards the top 54 for lodging and storing the hook member 72 within the hook recess 62.

As is readily discernible, the present invention can quickly measure the length and weight of a fish F. In many states where the laws do not permit the retention of fish F under a minimum length and/or weight, it is desirable to have immediately available suitable length measuring means and weighing means permitting a fisherman to measure the length and weight of a fish soon after it is caught. The present invention makes it possible for each fish to be measured and weighed while it is still held by the hook, thereby readily determining the length and weight of such fish and whether it may be retained under the law.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth. By way of example only, the elements of the present invention are not limited or restricted to any particular geometric configuration. More specifically, while the handle 19, the housing 20, and support member 44 are represented as being generally cylindrical, it is to be understood that they may be formed to have other geometric configurations, such as a square, a rectangle, etc. Similarly, the rod 36, the guide aperture 32, the sleeve 25, the bore 22, the compressor spring 48, may all take the form of any geometric configuration without departing from the spirit and scope of the present invention.

I claim:

1. A fishing rod comprising a structurally tapering rod section having a structure defining a generally longitudinal bore; a rod with an external surface and slidably disposed in said generally longitudinal bore, said rod having weight calibrations spaced longitudinally along the external surface thereof; a calibrated spring helically surrounding the external surface of the rod within the generally longitudinal bore and biasingly urging continuously the rod within the generally longitudinal bore; a hook support member connected to an end of the rod; and a hook member pivotally connected to the hook support member; and said calibrated spring yieldably, biasingly maintains the hook support member in an abutting relationship against said rod section when the rod is not being extended away from the rod section; and said hook support member has a structure defining an external wall, a top, and a hook recess formed along a portion of the external wall and the top.

2. The fishing rod of claim 1 wherein said structurally tapering rod section includes length indicia.

3. The fishing rod of claim 2 wherein said calibrated spring is a compression spring.

4. The fishing rod of claim 1 wherein said calibrated spring is a compression spring.

5. The fishing rod of claim 3 additionally comprising a sleeve slidably disposed within said generally longitudinal bore such as to essentially surround said calibrated compression spring.

6. The fishing rod of claim 1 additionally comprising a sleeve slidably disposed within said generally longitudinal bore such as to essentially surround said calibrated spring.

7. The fishing rod of claim 1 additionally comprising a guide member slidably lodged within said generally longitudinal bore, said guid member having a structure defining a guide aperture wherethrough said rod is slidably disposed.

8. The fishing rod of claim 5 additionally comprising a guide member slidably lodged within said generally longitudinal bore, said guide member having a structure defining a guide aperture wherethrough said rod is slidably disposed.

9. The fishing rod of claim 8 wherein said hook support member has a structure defining a hook recess for pivotally receiving said hook member such that said hook member does not generally extend away from the hook support member.

10. The fishing rod of claim 1 wherein said hook support member has a structure defining a hook recess for pivotally receiving said hook member such that said hook member does not generally extend away from the hook support member.

11. The fishing rod of claim 9 additionally comprising a collar means secured to an end of said rod within said generally longitudinal bore for providing a contact surface for said calibrated compression spring, said calibrated compression spring is in biasing contact with said collar means.

12. The fishing rod of claim 1 additionally comprising a collar means secured to an end of said rod within said generally longitudinal bore for providing a contact surface for said calibrated spring, said calibrated spring is in biasing contact with said collar means.

13. The fishing rod of claim 11 wherein said guide member comprises a head section and a base section integrally formed with the head section.

14. The fishing rod of claim 11 wherein said hook support member has a structure additionally defining an opening communicating with the hook recess, said hook member rotatably lodges in said opening.

15. The fishing rod of claim 1 wherein said hook member has a bow section which is pivotally lodged in the hook recess such that a substantial structure of the hook member is lodged in the hook recess and is offset and below a horizontal plane along said top.

16. A scale for weighing an object comprising a housing having a structure defining a generally longitudinal bore; a rod with an external surface and slidably disposed in said generally longitudinal bore, said rod having weight calibrations spaced longitudinally along the external surface thereof; a calibrated spring helically surrounding the external surface of the rod within the generally longitudinal bore and biasingly urging the rod within the generally longitudinal bore; a hook support member connected to an end of the rod; and a hook member pivotally connected to the hook support member; and said hook support member has a structure defining an external wall, a top, and a hook recess formed along a portion of the external wall and the top.

17. The scale of claim 16 wherein said calibrated spring is a compression spring and additionally comprises a sleeve slidably disposed within said generally longitudinal bore such as to essentially surround said calibrated spring.

18. The scale of claim 17 additionally comprises a guide member slidably lodged within said generally longitudinal bore, said guide member having structure defining a guide aperture wherethrough said rod is slidably disposed, and said hook support member has a structure defining a hook recess for pivotally receiving said hook member such that said hook member does not generally extend away from the hook support member.

19. The scale of claim 18 additionally comprising a collar means secured to an end of said rod within said generally longitudinal bore for providing a contact surface for said calibrated spring, said calibrated spring is in biasing contact with said collar means; and said guide member comprises a head section and a base section integrally formed with the head section; and said hook support member has a structure additionally defining an opening communicating with the hook recess, said hook member rotatably lodges in said opening.

20. The scale of claim 1 wherein said hook member has a bow section which is pivotally lodged in the hook recess such that a substantial structure of the hook member is lodged in the hook recess and is offset and below a horizontal plane along the top.

21. The scale of claim 18 wherein said end of the rod extends outside of said longitudinal bore.

22. The scale of claim 20 wherein said end of the rod extends outside of said longitudinal bore.

23. A fishing rod comprising a structurally tapering rod section having a structure defining a generally longitudinal bore; a rod with an external surface and slidably disposed in said generally longitudinal bore, said rod having weight calibrations spaced longitudinally along the external surface thereof; a calibrated spring helically surrounding the external surface of the rod within the generally longitudinal bore and biasingly urging the rod within the generally longitudinal bore; a hook support member connected directly to an end of the rod; and a hook member pivotally connected directly to the hook support member; and said hook support member has a structure defining an external wall, a top, a hook recess formed along a portion of the external wall and the top.

24. The fishing rod of claim 23 wherein said calibrated spring continously biases and urges the rod within the generally longitudinal bore.

25. The fishing rod of claim 23 wherein said hook member has a bow section which is pivotally lodged in the hook recess such that a substantial structure of the hook member is lodged in the hook recess and is offset and below a horizontal plane along said top.

26. The fishing rod of claim 24 wherein said calibrated spring yieldably, biasingly maintains the hook support member in an abutting relationship against the rod section when the rod is not being slid away from the rod section.

27. A fishing rod comprising a structurally tapering rod section having a structure defining a handle with a slidably disposed in said generally longitudinal bore, said rod having weight calibrations spaced longitudinally along the external surface thereof; a calibrated spring helically surrounding the external surface of the rod within the generally longitudinal bore and biasingly urging continuously the rod within the generally longitudinal bore; a hook support member connected to an end of the rod; a hook member pivotally connected to the hook support member; and said calibrated spring yieldably biasingly maintains the hook support member in an abutting relationship against said handle when the rod is not being extended away from said handle; and said hook support member has a structure defining an external wall, a top, and a hook recess formed along a portion of the external wall and the top.

28. The fishing rod of claim 27 wherein said hook member has a bow section which is pivotally lodged in the hook recess such that a substantial structure of the hook member is lodged in the hook recess and is offset and below a horizontal plane along said top.

29. A method for measuring the length of a fish and weighing the fish comprising the steps of:
(a) providing a fishing rod having a structurally tapering rod section with length indicia and including a structure defining a generally longitudinal bore having a rod with an external surface bearing weight calibrations and slidably disposed in said longitudinal bore with a compression spring helically surrounding the rod and biasingly continuously urging the rod within the longitudinal bore;
(b) connecting a hook support member to an end of said rod of step (a) wherein said hook support member has a hook recess;
(c) providing a hook member having a bow section;
(d) connecting pivotally the hook member to the hook support member and pivotally lodging the bow section of the hook member in the hook recess;
(e) providing a fish;
(f) elevating the fish to be in a position contiguous to the length indicia on the structurally tapering rod section;
(g) determining the length of the fish from length indicia;
(h) pivoting the bow section of the hook member out of the hook recess;
(i) engaging the fish to the bow section of the hook member out of the hook recess such that the weight of the fish causes the rod to compress the compression spring and expose the external surface of the rod bearing the weight calibrations; and
(j) determining the weight of the fish from the weight calibrations on the exposed external surface of the rod.

30. A fishing rod comprising a rod section having a structure defining a generally longitudinal bore; a support member; a hook member; a rod supporting said support member and supporting said hook member and having an external surface and slidably disposed in said generally longitudinal bore, said rod having weight calibrations spaced longitudinally along the external surface thereof; a calibrated spring helically surrounding the external surface of the rod within the generally longitudinal bore and biasingly urging the rod within the generally longitudinal bore; and said support has a structure defining an external wall, a top, and a hook recess formed along a portion of the external wall and the top.

31. The fishing rod of claim 30 wherein said hook member has a bow section which is pivotally lodged in the hook recess such that a substantialy structure of the hook member is lodged in the hook recess and is offset and below a horizontal plane along said top.

32. The fishing rod of claim 30 wherein an end of said rod extends outside of said longitudinal bore, and said end of said rod supports said support member and said hook member outside of said longitudinal bore.

33. The fishing rod of claim 31 wherein an end of said rod extends outside of said longitudinal bore, and said end of said rod supports said support member and said hook member outside of said longitudinal bore.

* * * * *